United States Patent [19]

Fukuzaki et al.

[11] Patent Number: 5,672,852
[45] Date of Patent: Sep. 30, 1997

[54] POSITION POINTING DEVICE INCLUDING A MEMORY AND A POSITION DETECTING DEVICE COUPLED BY AC FIELDS TO THE POINTING DEVICE

[75] Inventors: Yasuhiro Fukuzaki; Yuji Katsurahira, both of Saitama-ken, Japan

[73] Assignee: Wacom Co., Ltd., Saitama-ken, Japan

[21] Appl. No.: 406,203

[22] Filed: Mar. 17, 1995

[30] Foreign Application Priority Data

Mar. 18, 1994 [JP] Japan ................................ 6-049477

[51] Int. Cl.⁶ .............................. G08C 21/00; G09G 3/02
[52] U.S. Cl. ..................... 178/19; 178/18; 345/176; 345/179
[58] Field of Search ........................ 178/18, 19, 20; 345/156, 173, 174, 176, 177, 179

[56] References Cited

U.S. PATENT DOCUMENTS

| | | | |
|---|---|---|---|
| 4,617,515 | 10/1986 | Taguchi | 178/18 |
| 4,723,056 | 2/1988 | Tamaru | 128/19 |
| 4,786,765 | 11/1988 | Yamanami | 178/19 |
| 4,992,630 | 2/1991 | Mletzko | 345/173 |
| 5,245,336 | 9/1993 | Chen | 178/18 |
| 5,349,139 | 9/1994 | Verrier et al. | 345/179 |

FOREIGN PATENT DOCUMENTS

| | | |
|---|---|---|
| 63-70326 | 3/1988 | Japan. |
| 64-53223 | 3/1989 | Japan. |

*Primary Examiner*—Curtis Kuntz
*Assistant Examiner*—Vijay Shankar
*Attorney, Agent, or Firm*—Lowe, Price, LeBlanc & Becker

[57] ABSTRACT

A position detecting device and a position pointing device therefor transmit information concerning the position pointing device or an operator from a cordless position pointing device to a tablet. An AC field containing information about the position pointing device or the operator and a write instruction is transmitted to the position pointing device by an instruction source of the tablet. The information is stored in a memory of the position pointing device by an instruction extractor responsive to a controller of the position pointing device. The stored information is read out to a characteristic controller in response to an AC field containing a read instruction received by the device from the tablet.

19 Claims, 9 Drawing Sheets

POSITION POINTING DEVICE INCLUDING A MEMORY AND A POSITION DETECTING DEVICE COUPLED BY AC FIELDS TO THE POINTING DEVICE

BACKGROUND OF THE INVENTION

1. Field of the Invention

The present invention relates to improvements in a position detecting device and a position pointing device therefor which employ electromagnetic waves.

2. Description of the Related Art

Prior to the instant application, the applicant has proposed, in Japanese Patent Application No. 61-213970 (Japanese Patent Laid-Open No. 63-70326), a position detecting device in which a tablet exchanges AC field (e.g., an electromagnetic wave) signals with a position pointing device so as to determine the coordinate value of a position pointed by the position pointing device.

Briefly, the position detecting device disclosed in Japanese Patent Laid-Open No. 63-70326 has a plurality of loop coils constituting the tablet and is adapted to transmit an AC field of a predetermined frequency. The field is received by a resonance circuit provided in the position pointing device so that resonance takes place in the resonance circuit to emit electric wave. This electric wave is received by the loop coil so that a voltage is inducted in the loop coil. This operation is conducted successively on the plurality of loop coils constituting the tablet, so that the coordinate value of the position pointed by the position pointing device is determined based on the levels of the voltages induced in the loop coils.

The position detecting device of the type described faces a demand for the ability to enter various kinds of information in addition to the coordinate value of a pointed position, such as information which indicates that the position pointing device, e.g., a pen or the like, has been set to a position for pointing to a definite position (this state will be referred to as "pen-down state" hereinafter), as well as a demand for inputting, together with the coordinate values, information for continuously varying values of parameters other than the coordinate information, such as, for example, thickness or width of a line and hue or density (brightness) of the position or area appointed by the pointing device (these parameters will be referred to as "operating information" hereinafter), according to the software used.

To cope with such demands, the position pointing device disclosed in Japanese Patent Laid-Open No. 63-70326 employs a manual switch which selectively connects, to the resonance circuit which is constituted by a coil and a capacitor, an additional capacitor so as to slightly vary the resonance frequency according to the operation of the switch, the slight change in the resonance frequency being detected as a variation in the phase angle so as to be used as the operating information indicative of the aforesaid pen-down state.

In Japanese Patent Application No. 62-208293 (Japanese Patent Laid-Open No. 64-53223), the applicant also proposed a position detecting device having a resonance circuit including a coil the inductance of which continuously varies according to the pen pressure, so that the resonance frequency continuously varies according to the pen pressure, the linear variation in the resonance frequency being detected as a continuous variation in the phase angle so as to be used as the operating information for continuously varying the aforesaid parameter.

In such a type of position detecting device, however, the coordinate values of pointed positions or the operating information may incur errors due to the variations in the characteristics of individual position pointing devices, the habits of operators who use the position pointing devices, or other causes. In the past, such errors were determined before starting actual input operation in order to correct, based on the errors, the coordinate values of pointed positions or the operating information obtained through actual input operation so that accurate information may be obtained. This correcting operation must be carried out prior to every input operation, adding a laborious step. The errors could be stored in the tablet or a host system thereof beforehand and called up for the correcting operation before starting the actual input operation. In this case, however, the position pointing device and the operator allowed to use the tablet or the host system would be undesirably limited.

The type of position detecting device occasionally faces a demand for the ability to enter the coordinate value of a pointed position and the information for specifying an application simply by selecting one of a plurality of position pointing devices. This requires the plurality of position pointing devices to be prepared in advance and the application of each device be limited to entering lines and dots, erasing lines and dots, entering display colors, entering background colors, or the like. Conventionally, each position pointing device is equipped with a means for generating aforesaid information, e.g., a code generator, for generating information in accordance with the setting of a plurality of DIP switches in order to enter the above-mentioned information. This, however, requires a laborious operation of accurately resetting the plurality of DIP switches whenever the application of any of the position pointing devices needs to be changed.

The type of position detecting device faces another demand for the ability to enable operation only when a particular position pointing device is combined with a particular tablet. To meet the demand, conventionally, the position pointing devices were equipped with means for generating identifying codes, e.g., the code generators, which generate identifying codes in accordance with the setting of the plurality of DIP switches. This, however, presented a problem in that the identifying codes were disclosed easily at a glance of the setting of the plurality of DIP switches. To avoid the security problem, the plurality of set DIP switches could be replaced by a circuit board or the like having a fixed wiring; however, this would allow no identifying code to be changed.

SUMMARY OF THE INVENTION

Accordingly, an object of the present invention is to provide a position detecting device and a position pointing device therefor which are capable of transmitting the information on a position pointing device or an operator in addition to the coordinate value of a pointed position or operating information from a cordless position pointing device to a tablet.

Another object of the present invention is to provide a position detecting device and a position pointing device therefor which are capable of transmitting the information on an easy-to-change application from a cordless position pointing device to a tablet.

Still another object of the present invention is to provide a position detecting device and a position pointing device therefor which are capable of transmitting an easy-to-change and highly confidential identifying code from a cordless position pointing device to a tablet.

To these ends, according to one aspect of the present invention, there is provided a position detecting device wherein a position pointing device generates an electromagnetic wave having certain space distribution which corresponds to the coordinate value of a position pointed by the position pointing device, and a tablet detects the electromagnetic wave to determine the coordinate value of the position pointed by the position pointing device, the position pointing device controls the intensity characteristic or frequency characteristic of the electromagnetic wave or the time-dependent changes of these characteristics in accordance with predetermined information, and the tablet detects them to determine the predetermined information received from the position pointing device; the position pointing device being equipped with a storing means for storing predetermined individual information, an electromagnetic wave receiving means for receiving an electromagnetic wave which is transmitted from the tablet and which contains predetermined individual information and a write instruction therefor or a read instruction for the predetermined individual information, an instruction extracting means for extracting the predetermined individual information and the write instruction therefor or the read instruction for the predetermined individual information from the received electromagnetic wave, and an information control means for writing the predetermined individual information to the storing means in accordance with the extracted write instruction and for reading the predetermined individual information from the storing means as the predetermined information in accordance with the extracted read instruction; and the tablet being equipped with an instruction creating means for creating predetermined individual information and the write instruction therefor or the read instruction for reading the predetermined individual information, an electromagnetic wave transmitting means for transmitting an electromagnetic wave which contains the predetermined individual information and the write instruction therefor or the read instruction for the predetermined individual information to the position pointing device, and an information reproducing means for reproducing the predetermined individual information from the intensity characteristic, frequency characteristic or time-dependent changes of these characteristics of the detected electromagnetic wave.

The above and other objects, features, and advantages of the present invention will become clear from the following description when the same is read in conjunction with the accompanying drawings.

DESCRIPTION OF THE PREFERRED EMBODIMENTS

Before turning to the description of preferred embodiments, a description will be given of various basic forms of the present invention.

Figure 1:
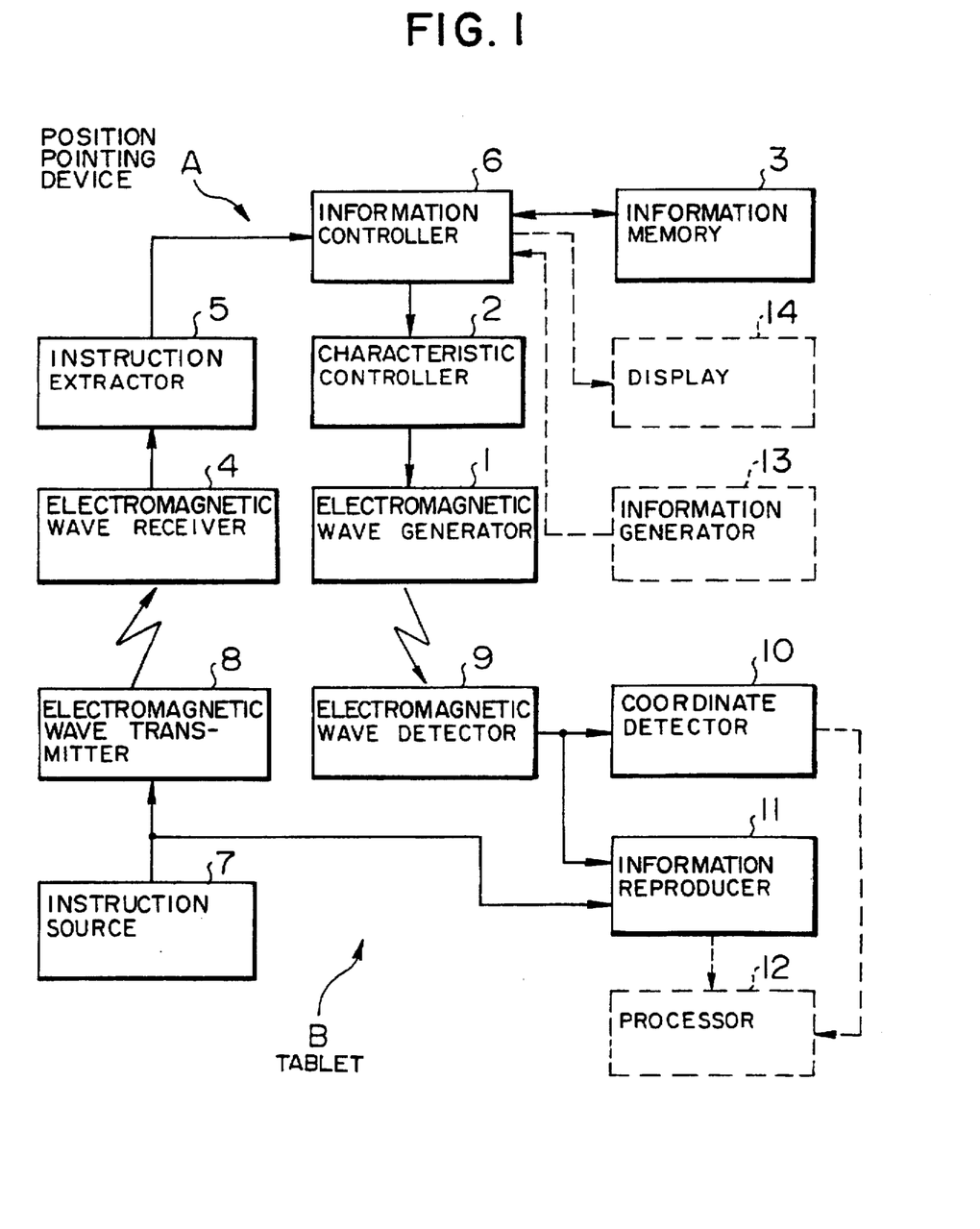
FIG. 1 is a block diagram illustrative of a basic form of the position detecting device and the position pointing device therefor in accordance with the present invention.

FIG. 1 is a block diagram illustrative of a basic form of the position detecting device and the position pointing device therefor. Position pointing device A in accordance with this basic form of the invention has an AC field, e.g., electromagnetic wave, e.g., generating means 1 for generating an AC field which has certain space distribution corresponding to the coordinate value of a pointed position; a characteristic control means 2 for controlling the intensity characteristic or the frequency characteristic or the time-dependent changes of these characteristics of an electromagnetic wave, which is emitted from the electromagnetic wave generating means 1, in accordance with predetermined information; a storing means 3 for storing predetermined individual information; an electromagnetic wave receiving means 4 for receiving the electromagnetic wave which is transmitted from the tablet and which contains the predetermined individual information and the write instruction therefor or the read instruction for the predetermined individual information; an instruction extracting means 5 for extracting the predetermined individual information and the write instruction therefor or the read instruction for the predetermined individual information from the received electromagnetic wave; and an information control means 6 for writing the predetermined individual information to the storing means in accordance with the extracted write instruction and for reading the predetermined individual information as the predetermined information from the storing means into the characteristic control means in accordance with the extracted read instruction.

Tablet B in accordance with this basic form of the invention has an instruction creating means 7 for creating the predetermined individual information and the write instruction therefor or the read instruction for the predetermined individual information; an electromagnetic wave transmitting means 8 for transmitting the electromagnetic wave, which contains the predetermined individual information and the write instruction therefor or the read instruction for the predetermined individual information, to position pointing device A; an electromagnetic wave detecting means 9 for detecting the electromagnetic wave emitted from position pointing device A; a coordinate detecting means 10 for determining the coordinate value of the position pointed by position pointing device A from the space distribution of the detected electromagnetic wave; and an information reproducing means 11 for reproducing the predetermined individual information from the intensity characteristic or frequency characteristic or the time-dependent changes of these characteristics of the detected electromagnetic wave.

As the predetermined individual information, the information on the characteristics of the individual position pointing devices such as the errors of the coordinate values of pointed positions, which are based on the variations in the characteristics of the individual position pointing devices, can be used. In this case, a processing means 12 for processing the coordinate values of pointed positions in accordance with the reproduced information should be provided in tablet B. Further, as the predetermined individual information, the information on the operators using the position pointing devices such as the errors of the coordinate values of pointed positions, which are based on operator's habits, can be used. In this case, the processing means 12 for processing the coordinate values of pointed positions in accordance with the information reproduced should be provided in tablet B. Furthermore, as the predetermined individual information, the information representing the applications of the individual position pointing devices can be used. In this case, a processing means for transferring the reproduced information to a host system together with the coordinate values pointed positions should be provided in tablet B. Further, as the predetermined individual information, the information for identifying the individual position pointing devices such as identifying codes can be used. In this case, a processing means for judging the reproduced information and controlling actuation should be provided in tablet B.

It is desirable to provide position pointing device A with an information generating means 13 for generating at least one type of operating information so as to transmit the operating information as well as the predetermined individual information to tablet B. In such a case, it is required that the instruction creating means 7 create a request instruction for the operating information, the instruction extracting means 5 extract the request instruction for the operating information from the received electromagnetic wave, the information control means 6 set the operating information in the characteristic control means 2 as the predetermined information in accordance with the extracted request instruction, and the information reproducing means 11 reproduce the operating information from the intensity characteristic or frequency characteristic or the time-dependent changes of these characteristics of the detected electromagnetic wave.

Moreover, position pointing device A should be provided with a displaying mean 14 for displaying the predetermined individual information stored in the storing means.

It is also desirable to employ a resonance circuit as the electromagnetic wave receiving means 4 of position pointing device A. The resonance circuit may be used as the electromagnetic wave generating means 1. In this case, the characteristic control means 2 of position pointing device A can be realized by changing the resonance characteristic of the resonance circuit. Further, a power extracting means should be provided for extracting electrical energy for driving the component units of position pointing device A from the electromagnetic wave received by the resonance circuit.

In FIG. 1, when the instruction creating means 7 of tablet B creates the predetermined individual information, e.g., the information on the error of the coordinate value of a pointed position, which is based on the variations in the characteristic of position pointing device A, and the write instruction therefor, an electromagnetic wave containing the information on the error and the write instruction therefor are sent from the electromagnetic wave transmitting means 8. The electromagnetic wave is received by the electromagnetic wave receiving means 4 of position pointing device A and the information on the error and the write instruction therefor are extracted from the received electromagnetic wave by the instruction extracting means 5. The information control means 6 writes the information on the error to the information storing means 3 in accordance with the write instruction.

After that, when the instruction creating means 7 of tablet B creates the read instruction for the predetermined individual information, an electromagnetic wave containing the instruction is transmitted from the electromagnetic wave transmitting means 8. The electromagnetic wave is received by the electromagnetic wave receiving means 4 of position pointing device A and the read instruction is extracted from the received electromagnetic wave by the instruction extracting means 5. The information control means 6 reads out the predetermined individual information stored in the information storing means 3, i.e., the information on the error of the coordinate value of a pointed position based on the variations in the characteristic of position pointing device A in this case, into the characteristic control means 2 as the predetermined information in accordance with the instruction. The characteristic control means 2 controls the intensity characteristic, frequency characteristic, or the time-dependent changes of these characteristics of the electromagnetic wave, which is emitted from the electromagnetic wave generating means 1, in accordance with the information.

The electromagnetic wave is detected by the electromagnetic wave detecting means 9 of tablet B, and the information reproducing means 11 reproduces the information on the error from the intensity characteristic, frequency characteristic, or the time-dependent changes of these characteristics of the detected electromagnetic wave. The reproduced information on the error is used by the processing means 12, for example, to correct the coordinate value of the pointed position detected by the coordinate detecting means 19.

When the instruction creating means 7 of tablet B generates the request instruction for the operating information, an electromagnetic wave containing the instruction is transmitted from the electromagnetic wave transmitting means 8. The electromagnetic wave is received by the electromagnetic wave receiving means 4 of position pointing device A and the request instruction for the operating information is extracted from the received electromagnetic wave by the instruction extracting means 5. In accordance with the instruction, the information control means 6 sets the operating information issued from the information generating means 13 in the characteristic control means 2 as the predetermined information. In accordance with the instruction the characteristic control means 2 controls the intensity characteristic, frequency characteristic, or the time-dependent changes of these characteristics of the electromagnetic wave emitted from the electromagnetic wave generating means 1.

The electromagnetic wave is detected by the electromagnetic wave detecting means 9 of tablet B, and the information reproducing means 11 reproduces the operating information from the intensity characteristic, frequency characteristic, or the time-dependent changes of these characteristics of the detected electromagnetic wave.

Providing position pointing device A with the displaying means 14 for displaying the predetermined individual information stored in the storing means 3 enables the operator to easily recognize the applications or the like of the position pointing devices. Employing the resonance circuit for the electromagnetic wave receiving means 4 makes it possible to efficiently receive electromagnetic waves. Likewise, employing the resonance circuit as the electromagnetic wave generating means 1 permits efficient generation of electromagnetic waves. In this case, the characteristic of the electromagnetic wave emitted to tablet B can be controlled by changing the resonance characteristic of the resonance circuit by the characteristic control means 2. Further, providing the resonance circuit with the power extracting means for extracting electrical energy from the electromagnetic wave received by the resonance circuit makes it possible to obtain power for driving the component units.

The embodiments of the present invention will now be described with reference to the accompanying drawings. In the examples given below, the transmission of information from the tablet to the position pointing device is based on the duration of an electromagnetic wave, while the transmission of information from the position pointing device to the tablet is based on the frequency of the electromagnetic wave, and coordinate detection is carried out in a different period from the transmission of the information.

Figure 2:
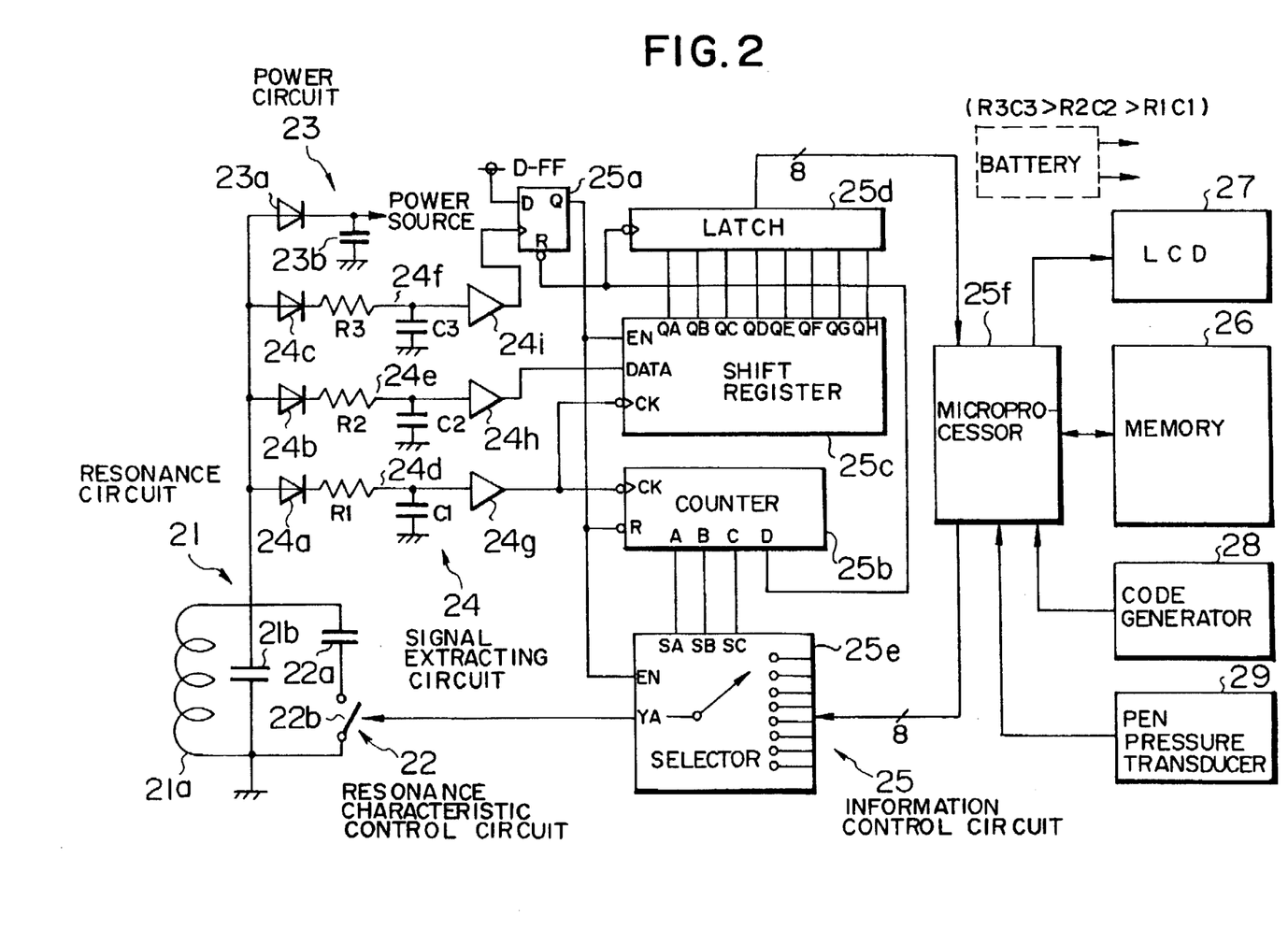
FIG. 2 is a configuration diagram of an embodiment of the position pointing device in accordance with the present invention.

FIG. 2 shows an embodiment of the position pointing device in accordance with the present invention. Position pointing device A in this drawing has a coil 21a, capacitors 21b, 22a, and 23b, a switch 22b, diodes 23a, 24a, 24b, and 24c, low-pass filters (LPF) 24d, 24e, and 24f, comparators 24g, 24h, and 24i, a D flip-flop 25a, a counter 25b, a shift register 25c, a latch 25d, a selector 25e, a microprocessor 25f, a memory 26, a liquid crystal display 27, a code generator 28, and a pen pressure transducer 29.

The coil 21a and the capacitor 21b are interconnected in series to constitute a resonance circuit 21 which is well known. The resonance circuit 21 constitutes the afore generating magnetic wave generating means and the electromagnetic wave receiving means.

The capacitor 22a is connected in parallel to the capacitor 21b of the resonance circuit 21 via the switch 22b to constitute a resonance characteristic circuit 22, i.e., the aforesaid characteristic control means, for changing the resonance frequency of the resonance circuit 21 in accordance with the ON/OFF state of the switch 22b.

The diode 23a and the capacitor 23b constitute a power circuit 23 which takes out DC voltage from induced voltage appearing in the resonance circuit 21 and supplies it as line voltage to other circuits. A battery may be provided as necessary.

The diode 24a, the low-pass filter 24d, and the comparator 24g take out the induced voltage which lasts for a certain time or longer from the induced voltage appearing in the resonance circuit 21 by means of the low-pass filter 24d having a relatively small time constant (t) and shape the waveform thereof to produce clocks. The diode 24b, the low-pass filter 24e, and the comparator 24h take out only the induced voltage which lasts for not less than a certain period which is sufficiently longer than the aforesaid certain time from the induced voltage appearing in the resonance circuit 21 by means of the low-pass filter 24e having a medium time constant (t) and shape the waveform thereof to generate an information bit of code "1". The diode 24c, the low-pass filter 24f, and the comparator 24i take out only the induced voltage which lasts for not less than a predetermined period which is sufficiently longer than the aforesaid certain period from the induced voltage appearing in the resonance circuit 21 by means of the low-pass filter 24f having a relatively large time constant (t) and shape the waveform thereof to generate an actuation signal. These components constitute a signal extracting circuit 24, i.e., the aforesaid instruction extracting means.

The D flip-flop 25a is set by the output of the comparator 24i, i.e., the actuation signal, and it waits until the counter 25b counts clocks to a predetermined number of bits, namely, 8 bits in this case, then supplies a Q output thereof to the counter 25b, the shift register 25c, and the selector 25e. The counter 25b is started by the Q output of the D flip-flop 25a, counts the outputs of the comparator 24g, i.e., clocks, and supplies the count value to the selector 25e. The shift register 25c is actuated together with the counter 25b by the Q output of the D flip-flop 25a, then reads the output signal of the comparator 24h, i.e., the information bit, in accordance with the clocks. The 8-bit latch 25d latches the output of the shift register 25c when the counter 25b counts the clocks for 8 bits. The selector 25e sends the information composed of 8 bits of binary code, which is received from the microprocessor 25f, one bit at a time to the switch 22b in synchronization with the clocks. The switch 22b is turned OFF in response to code "0" or turned ON in response to code "1", thereby changing the resonance frequency of the resonance circuit 21 to transmit the information to tablet B.

Figure 3:
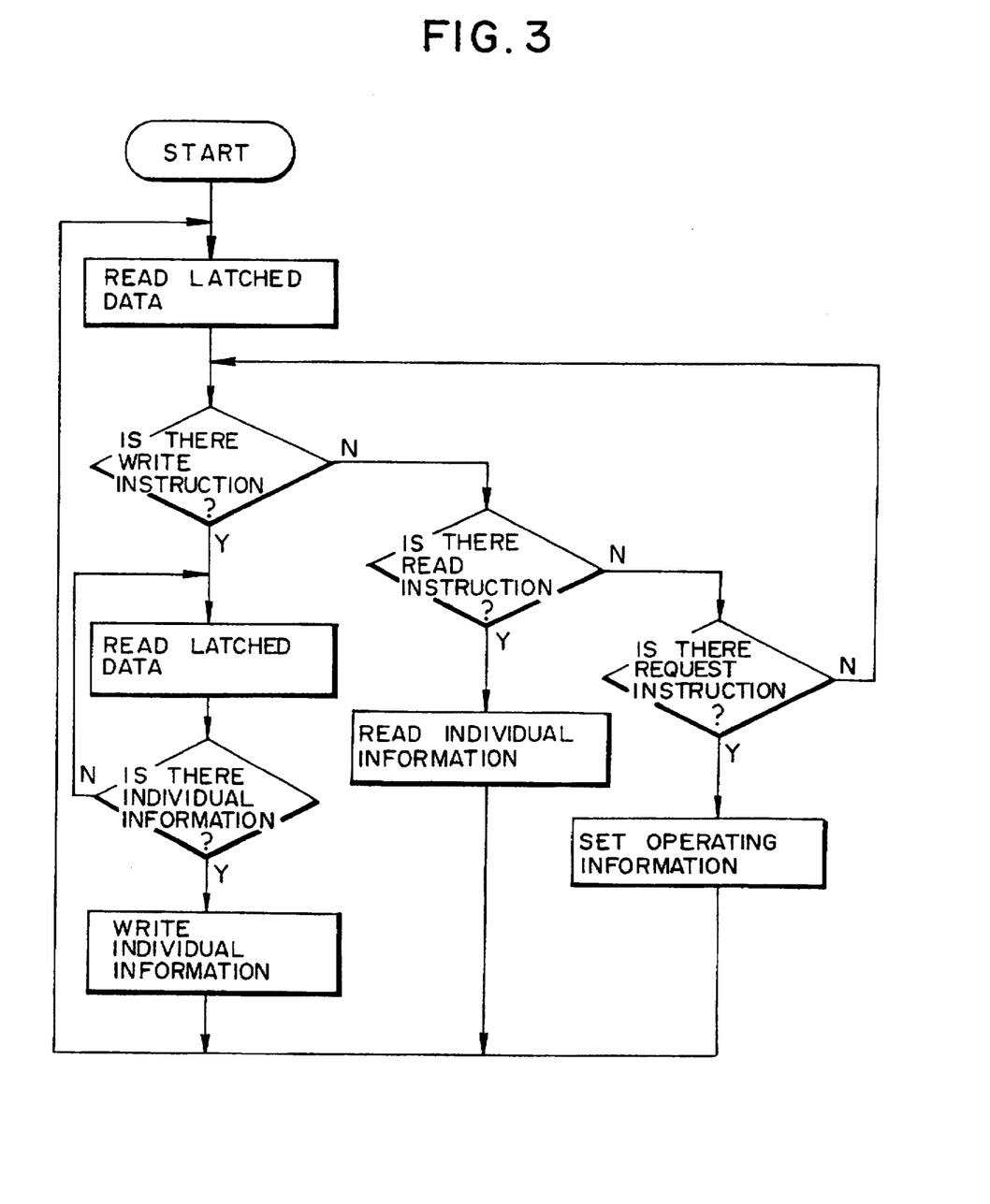
FIG. 3 is a flowchart illustrative of the processing implemented by a microprocessor shown in FIG. 2.

The microprocessor 25f periodically reads the 8-bit information held in the latch 25d and controls component units in accordance with the read information. More specifically, if the read information is the write instruction for the predetermined individual information, then the microprocessor 25f writes the information received in the subsequent information transmitting period to the memory 26; or if the read information is the read instruction for the predetermined individual information, then it supplies the information stored in the memory 26 to the selector 25e; or if the read information is the request instruction for the operating information, then it supplies the operating information based on the output signal from the code generator 28 or the pen pressure transducer 29 to the selector 25e. The flowchart of the processing performed by the microprocessor 25f is given in FIG. 3.

The section comprised of the parts 25a through 25f constitutes the information control circuit 25, i.e., the aforesaid information control means.

The memory 26 is a well-known random access memory and it constitutes the storing means. The liquid crystal display 27 is provided, for example, on one side surface of an enclosure as shown in FIG. 4 and it displays the contents stored in the memory 26, particularly the information on the applications of the position pointing devices, thus constituting the displaying means mentioned above.

Figure 4:
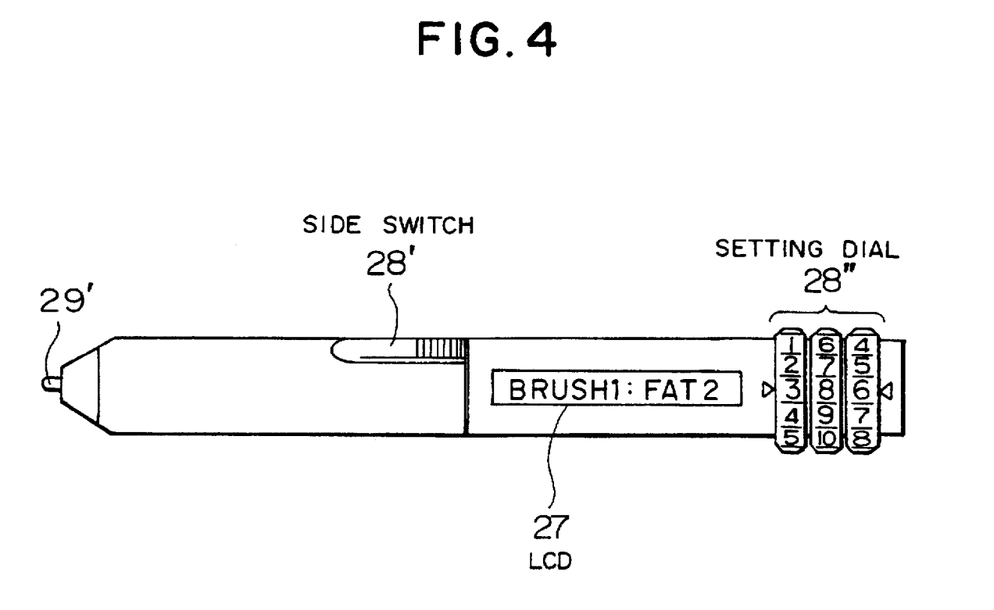
FIG. 4 is a side view of the position pointing device.

The code generator 28 outputs digital signals which correspond to the operation states of a side switch 28' or a dial 28" for setting, for instance, the information on the gradation of the basic colors, namely, red, green, and blue shown in FIG. 4. The pen pressure transducer 29 outputs digital signals which correspond to the pressure applied to a pen tip 29' of the enclosure illustrated in FIG. 4, i.e., the pen pressure. The code generator 28 and the pen pressure transducer 29 constitute the information generating means described above.

Figure 5:
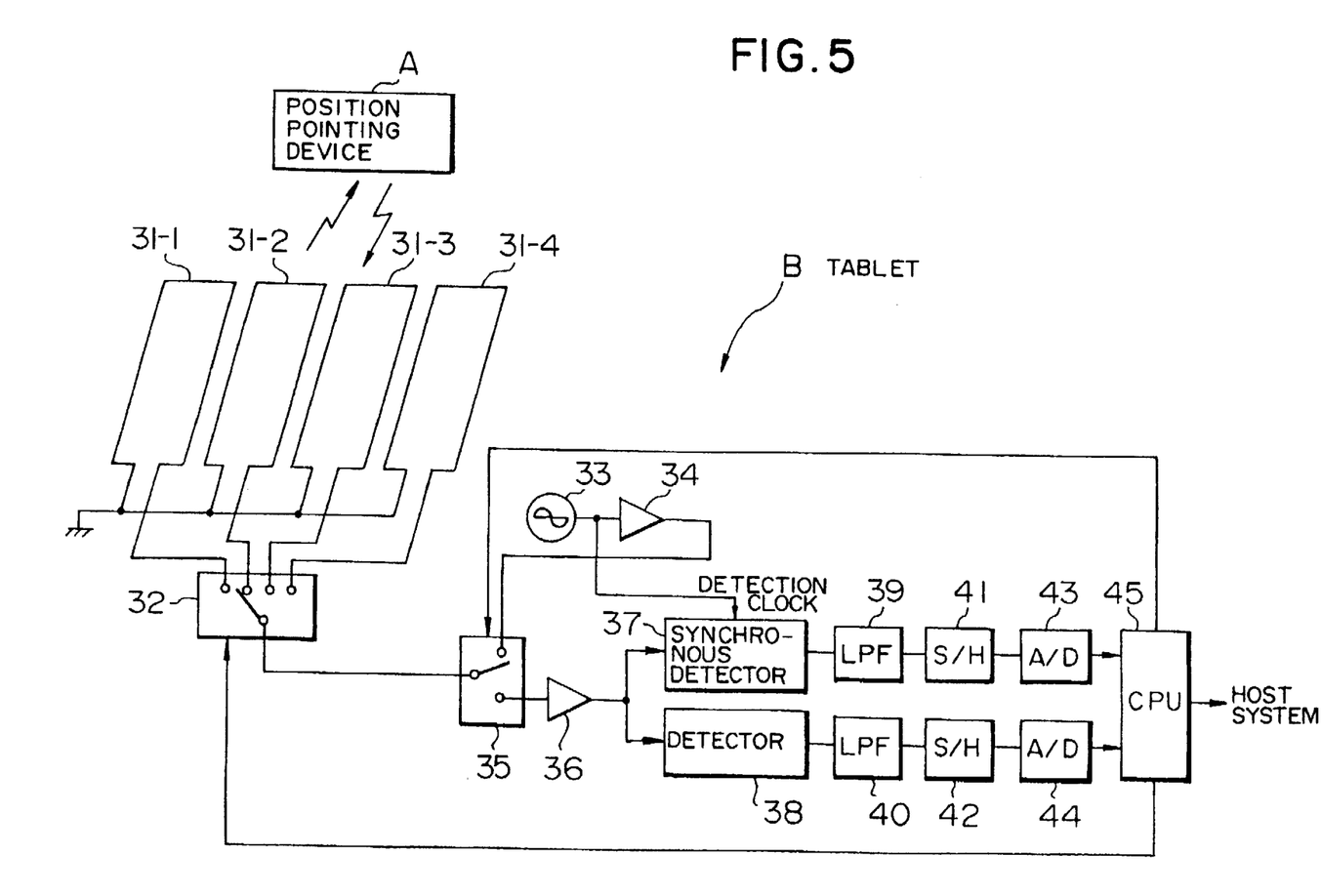
FIG. 5 is a configuration diagram illustrative of an embodiment of the tablet of the position detecting device in accordance with the present invention.

FIG. 5 shows an embodiment of the tablet of the position detecting device in accordance with the present invention. Tablet B shown in this drawing has loop coils 31-1, 31-2, 31-3, and 31-4, a selector circuit 32, an oscillator 33, a current driver 34, a transmit/receive switching circuit 35, a receiving amplifier 36, a synchronous detector 37, a detector 38, low-pass filters (LPF) 39, 40, sample holding circuits (S/H) 41, 42, analog-to-digital (A/D) converting circuits 43, 44, and a central processing unit (CPU) 45.

The loop coils 31-1 through 31-4 are arranged approximately in parallel to each other in the position detecting direction, one end of each being connected to the selector circuit 32 and the other end being grounded in common. The selector circuit 32 selects one of the loop coils 31-1 through 31-4 in accordance with a selecting signal received from the central processing unit 45 in a manner to be described later.

The oscillator 33 generates a sinusoidal AC signal of a frequency which is nearly equal to the resonance frequency of the resonance circuit 21 of position pointing device A and sends it to the current driver 34 and the synchronous detector 37. The current driver 34 converts the AC signal into an electric current and sends it out to the transmit/receive switching circuit 35. The transmit/receive switching circuit 35 connects the loop coil selected by the selector circuit 32 to the current driver 34 and the receiving amplifier 36 alternately in accordance with a transmit/receive switching signal received from the central processing unit 45 in a manner to be discussed later.

The receiving amplifier 36 amplifies the induced voltage which occurs in the selected loop coil and which is received through the selector circuit 32 and the transmit/receive switching circuit 35, then sends the amplified induced voltage to the synchronous detector 37 and the detector 38.

The synchronous detector 37 synchronously detects the induced voltage occurring in the foregoing selected loop coil, i.e., the received signal, with the AC signal from the oscillator 33 used as the detection signal and sends it to the low-pass filter 39. The detector 38 detects the induced voltage occurring in the loop coil, i.e., the received signal, and supplies it to the low-pass filter 40.

The low-pass filters 39 and 40 have shut-off frequencies which are sufficiently lower than the resonance frequency of the resonance circuit 21; they convert the signals output from the synchronous detector 37 and the detector 38 into DC signals and send the DC signals to the A/D converting circuits 43 and 44 via the sample holding circuits 41 and 42. The A/D converting circuits 43 and 44 carry out analog-to-digital conversion on the outputs of the low-pass filters 39 and 40, respectively, and supply them to the central processing unit 45.

The central processing unit 45 calculates the position of the resonance circuit 21 in accordance with the distribution of the levels of the respective received signals which occurred in the respective loop coils 31-1 through 31-4 during a coordinate detection period and which have been converted into digital values by the A/D converting circuit 44; and during the information transmitting period, it transmits, from the loop coil located closest to the resonance circuit 21 among the loop coils 31-1 through 31-4, the predetermined individual information, the write instruction, the read instruction, the request instruction for operating information, or the like, which consists of 8 information bits using an electromagnetic wave lasting for a predetermined period of time or more as the actuation signal, the following electromagnetic wave lasting sufficiently shorter than the predetermined period of time but lasting for a certain period of time or longer as the information bit of code "1", and an electromagnetic wave lasting sufficiently shorter than the certain period of time but lasting for a certain time or longer as the information bit of code "0". The central processing unit 45 also detects the phase difference from the AC signal received from the oscillator 33 in accordance with the levels of the received signals which occurred in the loop coil located nearest to the resonance circuit 21 among the loop coils 31-1 through 31-4 at the timing when the electromagnetic wave was continuously generated for a predetermined period or longer during the information transmitting period and at timings immediately after a subsequent electromagnetic wave lasting sufficiently shorter than the predetermined period of time but lasting for a certain period of time or longer or a subsequent electromagnetic wave lasting sufficiently shorter than the predetermined period of time but lasting for a certain time or longer was generated a total of eight times, the received signals having been converted to digital values through the A/D converting circuit 43; and it detects the variations in the resonance frequency of the resonance circuit 21 at the respective timings, thus reproducing the predetermined individual information or the operating information composed of the eight information bits received from position pointing device A.

Tablet B described previously is designed for position detection in one direction; however, in this embodiment, it is needless to say that a plurality of loop coils similar to the loop coils 31-1 through 31-4 may be arranged so that they cross orthogonally therewith, a selector circuit similar to that described above provided, and other circuit selectively used so as to perform alternate position detection, thus detecting a pointed position in two orthogonal directions (x and y directions).

Figure 6:
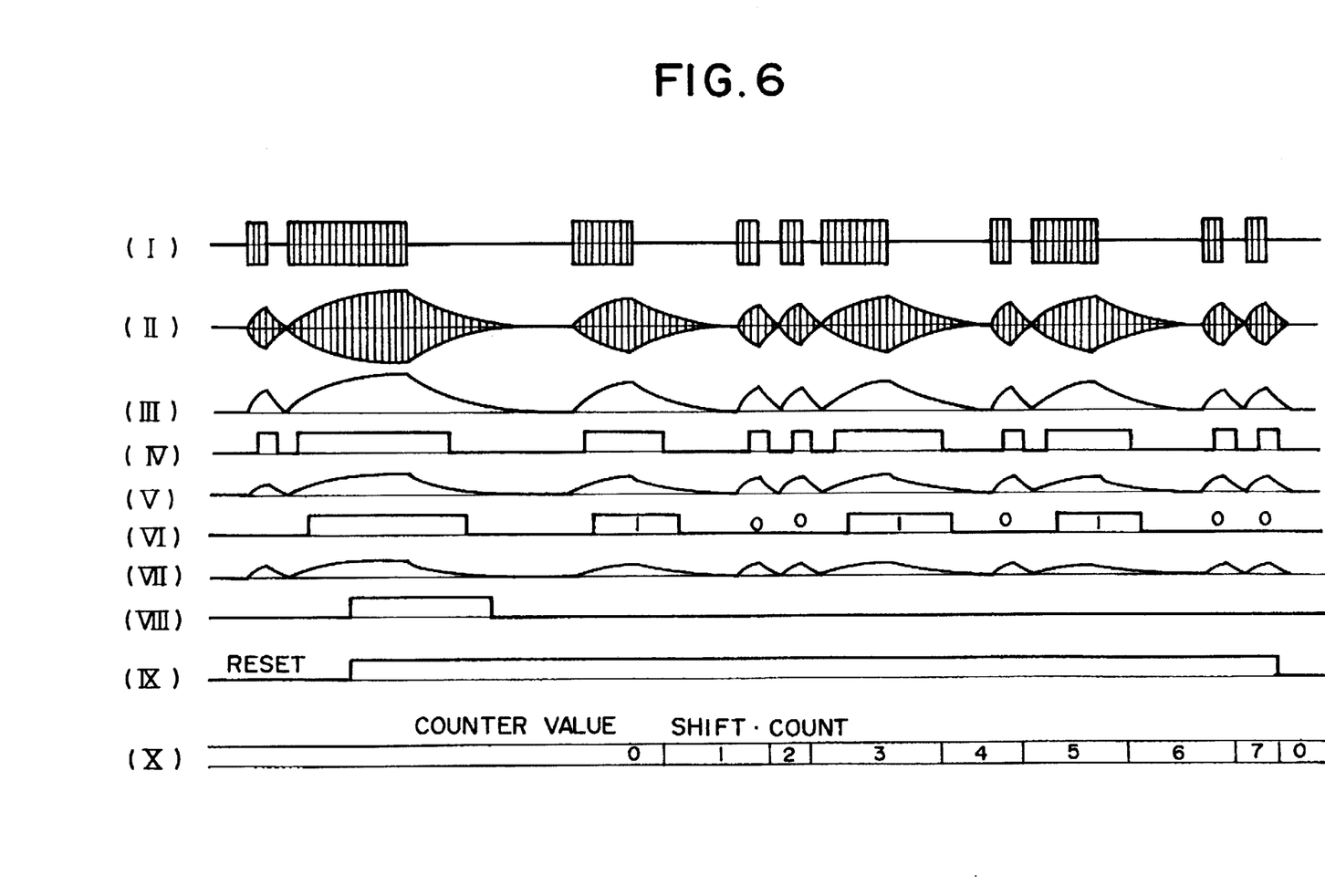
FIG. 6 includes operation waveforms involved in an embodiment.

FIG. 6 illustrates the examples of the operation waveforms in this embodiment and particularly, the waveforms observed during the information transmitting period. The following describes the operations of the aforesaid position detecting device and the position pointing device.

The operations of the devices are roughly divided into those carried out during the coordinate detection period and those carried out during the information transmitting period, and these two types of operations are normally repeated alternately. Alternatively, however, the information transmitting period may be inserted only when necessary.

During the coordinate detection period, the central processing unit 45 controls the transmit/receive switching circuit 35 so that the output of the selector circuit 32 is connected to the current driver 34 and the receiving amplifier 36 alternately for a predetermined duration, which is sufficiently shorter than the aforesaid predetermined period of time (the duration may be identical to the aforesaid certain period of time) at fixed intervals, and also controls the selector circuit 32 so that the loop coil located most closely to position pointing device A is selected among the loop coils 31-1 through 31-4 while the output of the selector circuit 32 is being connected to the current driver 34, i.e., while the electromagnetic wave is being generated, and the loop coils 31-1 through 31-4 are selected in sequence while the output of the selector circuit 32 is being connected to the receiving amplifier 36, i.e., while the electromagnetic wave is being detected.

During the information transmitting period, the central processing unit 45 controls the transmit/receive switching circuit 35 so that the output of the selector circuit 32 is connected continuously to the current driver 34 for not less than a predetermined period of time, which is sufficiently longer than the certain period of time mentioned above, and after that connected continuously to the receiving amplifier 36 for a period of time which is nearly the same as the predetermined period of time, then connected alternately to the current driver 34 and the receiving amplifier 36 for a certain period of time which is sufficiently shorter than the aforesaid predetermined period of time or for a certain time which is sufficiently shorter than the aforesaid certain period of time. The central processing unit 45 also controls the selector circuit 32 so that the loop coil located most closely to position pointing device A is selected among the loop coils 31-1 through 31-4 while the output of the selector circuit 32 is being connected to the current driver 34, i.e., while the electromagnetic wave is being generated and also while it is being connected to the receiving amplifier 36, i.e., while the electromagnetic wave is being detected. Usually, the information is transmitted from position pointing device A to tablet B during the subsequent information transmitting period; the transmit/receive switching circuit 35 may be controlled, however, so that the output of the selector circuit 32 is alternately connected to the current driver 34 and the receiving amplifier 36 for a certain time which is sufficiently shorter than the certain period of time if there is no information to be transmitted from tablet B to position pointing device A.

The operation of the tablet during the coordinate detection period will be omitted because it is already disclosed in the previously mentioned Japanese Patent Laid-Open Nos. 63-70326, 64-53223, etc. The electromagnetic wave which is generated for a predetermined duration at fixed intervals in the loop coil closest to the resonance circuit 21 of position pointing device A of tablet B during the coordinate detection period causes similar induced voltage to appear in the resonance circuit 21 of position pointing device A. The electromagnetic wave is detected through the diodes 24a, 24b and it further passes through the low-pass filters 24d, 24e. At this point, the output of the low-pass filter 24f does not exceed the threshold value of the comparator 24i and no actuation signal is issued. Therefore, the D flip-flop 25a is not set and none of the counter 25b, the shift register 25c, and the selector 25e are actuated.

During the information transmitting period, which follows the coordinate detection period, when electromagnetic wave I lasting for not less than the predetermined period of time is emitted from the loop coil closest to the resonance circuit 21 of position pointing device A of tablet B, electromagnetic wave I causes like induced voltage II to appear in the resonance circuit 21 of position pointing device A. Induced voltage II in turn causes the comparator 24i to generate actuation signal VIII via the diode 24c and the low-pass filter 24f (VII). Actuation signal VIII sets (IX) the D flip-flop 25a, causes the counter 25b to initiate counting, and enables the shift register 25c and the selector 25e.

After that, electromagnetic wave I emitted from the loop coil closest to the resonance circuit 21 of position pointing device A of tablet B for a certain period of time which is sufficiently shorter than the aforesaid predetermined period of time or for a certain time which is sufficiently shorter than the certain period of time in accordance with the information to be transmitted to position pointing device A causes like induced voltage II to be generated in the resonance circuit 21 of position pointing device A, and they cause the comparator 24g to generate clock IV via the diode 24a and the low-pass filter 24d (III) and also causes the comparator 24h to generate 8-bit information, namely, "10010100" (VI), comprised of the information bit of code "1" and the information bit of code "0", via the diode 24b and the low-pass filter 24e (V). In this case, the information bit of code "1" derives from the induced voltage which corresponds to electromagnetic wave I lasting for the certain period of time which is sufficiently longer than the certain time, while the information bit of code "0" derives from the induced voltage which corresponds to electromagnetic wave I lasting for the certain time.

Clock IV increments the value on the counter 25b and causes the shift register 25c to read in 8-bit information (VI) successively. When the counter 25b counts clock IV for eight bits, it resets the D flip-flop 25a and causes the latch 25d to latch the data of the shift register 25c, i.e., 8-bit information (VI). The information held in the latch 25d is periodically read by the microprocessor 25f as described previously and necessary processing is carried out in accordance with the read information.

While clock IV is being counted, the selector 25e turns the switch 22b ON or OFF in accordance with the information comprised of eight bits of binary code received from the microprocessor 25f in order to change the resonance frequency of the resonance circuit 21.

Induced voltage II causes a received signal (induced voltage), not shown, to be produced in the loop coil located most closely to the resonance circuit 21 of position pointing device A of tablet B. At the point when a received signal based on induced voltage II derived from the electromagnetic wave lasting for the predetermined period of time or longer is generated, however, the D flip-flop 25a is in the reset state and the selector 25e is in the disabled state; therefore, the switch 22b is OFF, meaning that the capacitor 22a is not connected to the resonance circuit 21. Hence, the output value of the A/D converting circuits 43 based on the received signal at that point provides the reference value for detecting the phase difference.

Taking the then output value of the A/D converting circuit 43 as the reference value, the central processing unit 45 compares with the reference value the output values based on the received signals which are received after that and which are converted by the A/D converting circuit 43. If the output value is identical to the reference value, then the switch 22b is turned OFF, which corresponds to code "0" or if it is different from the reference value, then the switch 22b is turned ON, which corresponds to code "1", thus reproducing the information received from position pointing device A. The central processing unit 45 then carries out the processing in accordance with the reproduced information, i.e., the predetermined individual information or operating information; for example, it corrects the coordinate value of a pointed position in accordance with the error information on position pointing device A and sends the corrected coordinate value to the host system. After that, the coordinate detection period comes again and the same coordinate detection and information transmission as those described above are repeated.

Thus, according to the present embodiment, the predetermined individual information can be written to the memory 26 of position pointing device A from tablet B and read out as necessary. Hence, writing the error information on the coordinate values of pointed positions based on the variations in the characteristic of position pointing device A in advance as the individual information eliminates the need of determining the error every time the operation is started as in the past and it also permits input operation to be started immediately even when a different tablet is used. Likewise, employing the information on applications as the individual information eliminates the need of setting or the like of a plurality of DIP switches and it enables the information to be displayed on the liquid crystal display 27. Further, employing identifying codes as the individual information eliminates the danger of the identifying codes being disclosed to other persons and also allows the contents of the identifying codes to be changes as required, thus making it possible to add to the security by rewriting the identifying codes each time they are used. The identifying codes are prevented from being displayed on the liquid crystal display 27. Moreover, it is possible to transmit the operating information such as the operation on the side switch 28', the setting of the dial 28", and the pen pressure, to tablet B.

It is naturally possible to assign a plurality of types of individual information to a single position pointing device. In this case, it is needless to say that the processing can be implemented for each individual type of information in accordance with the write instruction or the read instruction for the each individual type of information. In the embodiment, the number of bits of the information transmitted at a time is eight, but it is not limited to eight. Likewise, in the embodiment, the information on the variations in the resonance characteristic controlled by the resonance characteristic control circuit is transmitted in a binary mode, that is, one bit of information is transmitted at a time; however, the information of 2 bits or more may be transmitted at a time. Furthermore, it is not always necessary to transmit all individual information or instructions during one information transmitting period; they may be divided and transmitted in a few information transmitting periods.

Figure 7A:
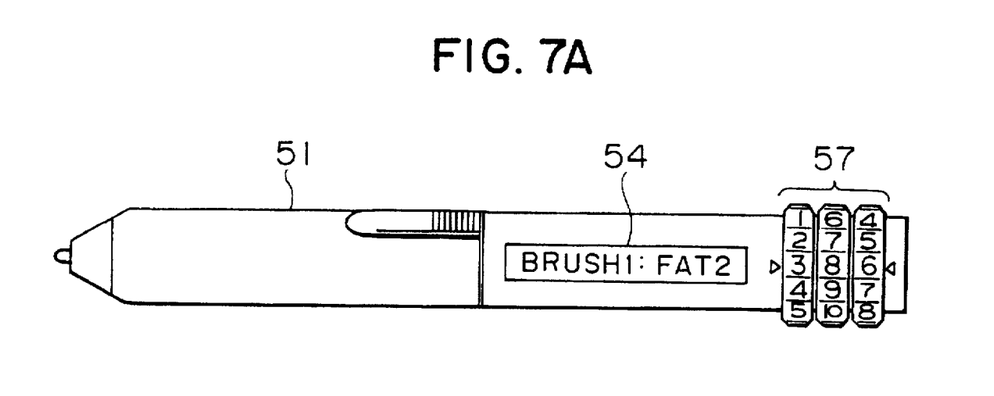
FIGS. 7A–7C is an illustration of an application example of the present invention.
Figure 7B:
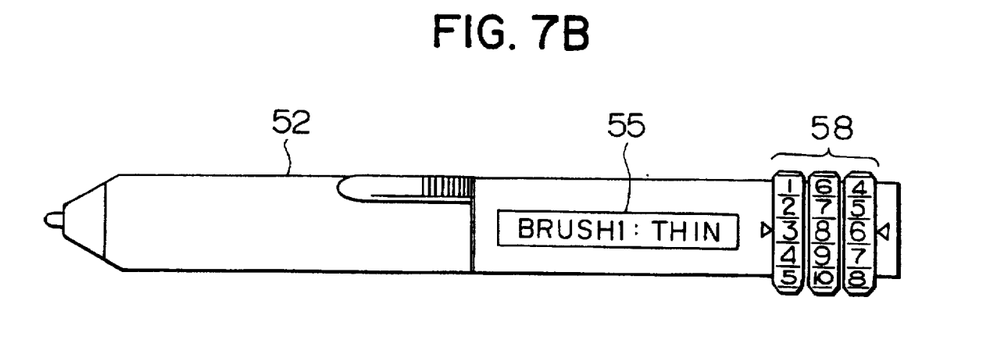
Figure 7C:
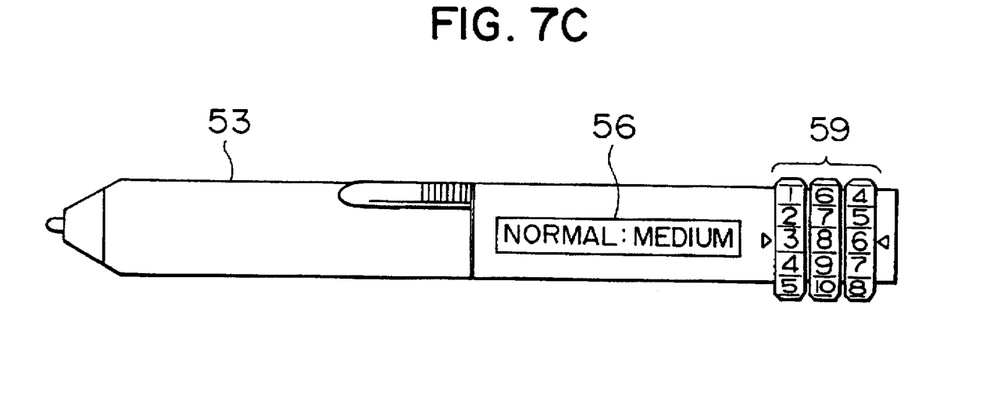

FIG. 7 shows an example wherein the present invention is applied and it shows a plurality of position pointing devices which are set for respective applications. More specifically, individual information for setting a thick brush type pen, a thin brush type pen, and a medium brush type pen has been written to position pointing devices denoted by reference numerals 51, 52, and 53, respectively. The descriptions of the respective applications, namely, "BRUSH1: FAT2," "BRUSH1: THIN," and "NORMAL: MEDIUM," are displayed on the liquid crystal displays 54, 55, and 56. Such information as the one on the gradation of the basic colors, namely, red, green, and blue, can be set by setting dials 57, 58, and 59. Thus, by writing the individual information for the respective applications to the plurality of position pointing devices, the individual information for the individual applications as well as the coordinate values of pointed positions can be transmitted to the tablet, and the set contents can be read on the liquid crystal displays. These features permit easy use of the devices for each application.

Figure 8A:
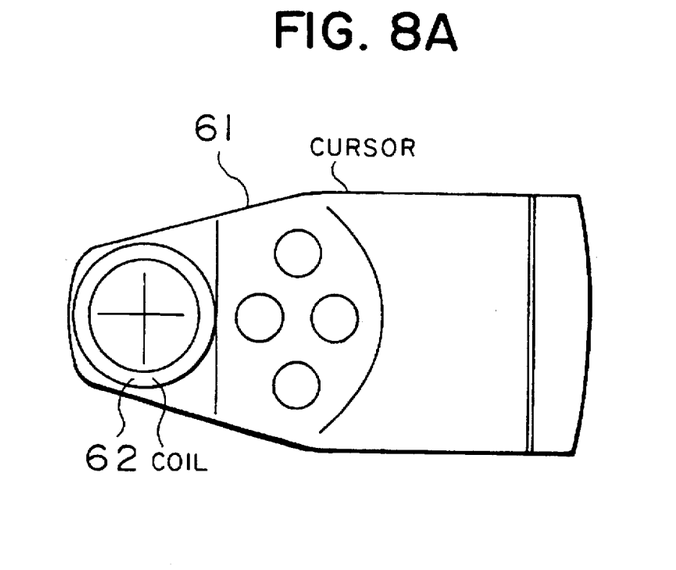
FIGS. 8A–8B is an illustration of another application example of the present invention.
Figure 8B:
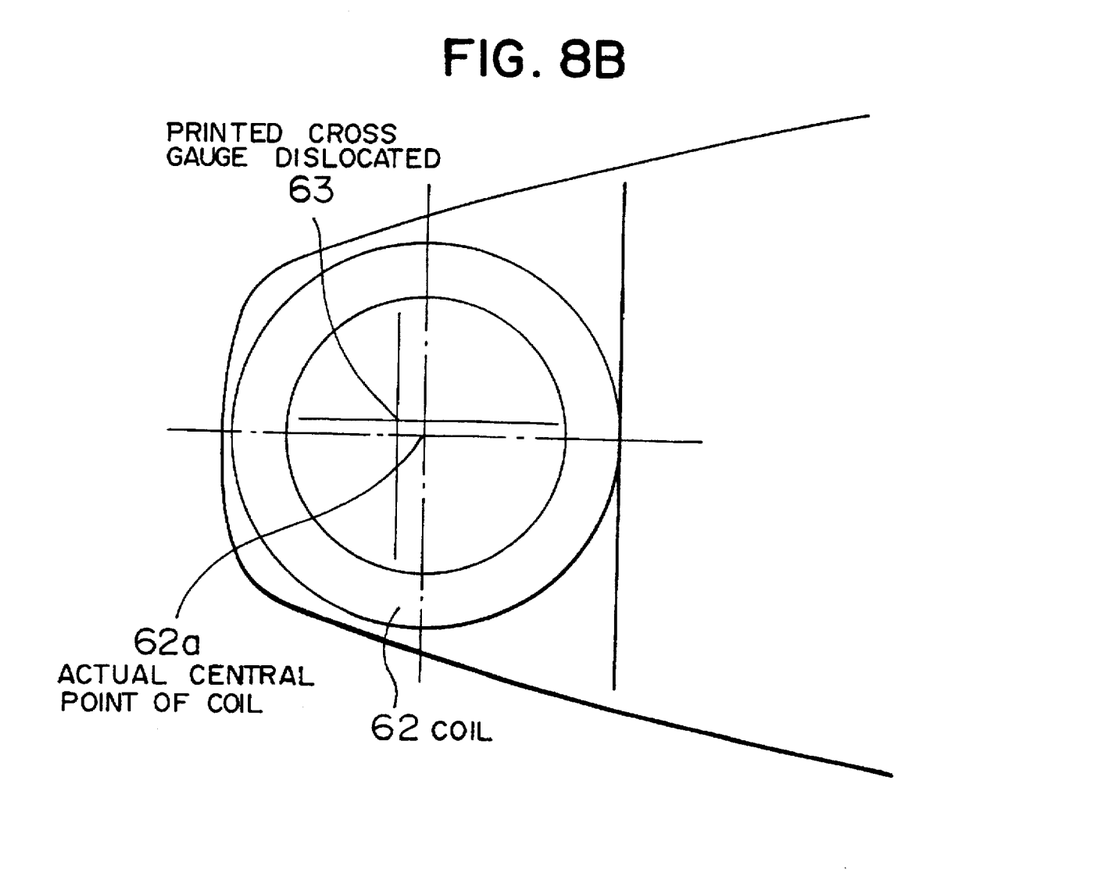

FIG. 8 shows another example wherein the present invention is applied. The example illustrates a cursor type position pointing device which is provided with the information on the error of a pointed position. In the drawing, numeral 61 denotes the cursor type position pointing device. A printed cross gauge 63 indicating an input position is dislocated with respect to a central point 62a of a coil 62 of the resonance circuit, i.e., the actual input point. In this case, writing beforehand the amount and direction (angle) of the dislocation of the cross gauge 63 from the central point 62a as the individual information enables accurate coordinate inputs even if the printing accuracy of the cross gauge is decreased. It is necessary to detect the rotational angle of the position pointing device 61 on the tablet surface to correct the dislocation; how to carry out the detection for the correction is publicly known through, for example, Japanese Patent Laid-Open No. 3-244085.

Figure 9:
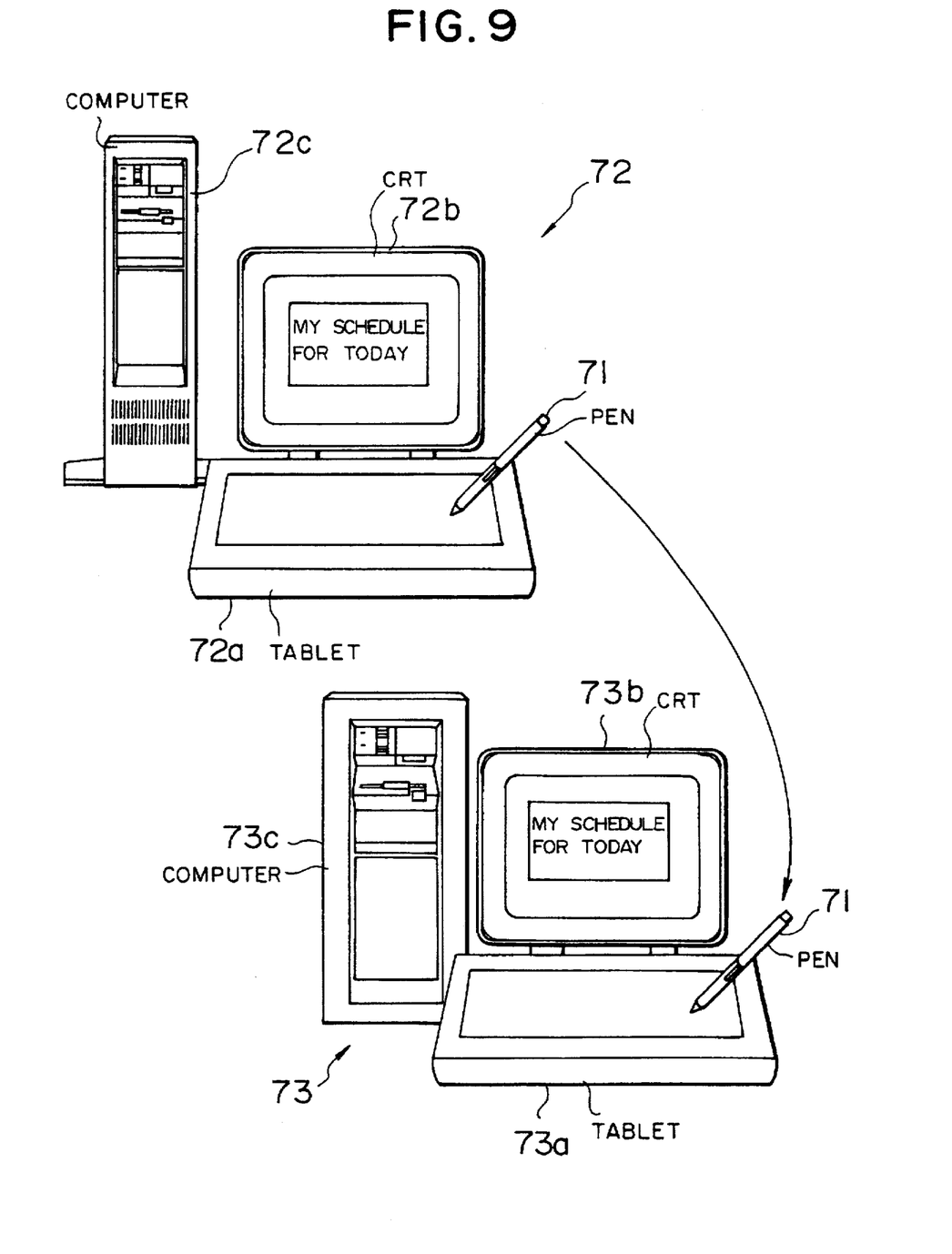
FIG. 9 is an illustration of still another application example of the present invention.

FIG. 9 shows still another example wherein the present invention is applied. The example shows a position pointing device equipped with the personal information of an owner thereof as the individual information. In the drawing, numeral 71 denotes a position pointing device used with a computer system 72 typically constituted by a tablet 72a, a CRT 72b, and a computer main unit 72c. Writing personal information of the owner such as a daily schedule in advance to the position pointing device 71 enables the personal information to be referred to or updated in another computer system 73 constituted by a tablet 73a, a CRT 73b, and a computer main unit 73c.

The examples described so far refer to the type of devices designed to detect coordinates by transmitting and receiving electromagnetic waves alternately between the position pointing device and the tablet. The present invention can be applied in the same manner, however, to a different type of devices designed to detect coordinates by continuously transmitting and receiving electromagnetic waves, by intermittently transmitting and receiving electromagnetic waves only during the information transmitting period. Further, in the description given above, the transmission of the instructions is based on the duration of an electromagnetic wave; however, it may alternatively be based on a pause or it may further alternatively be accomplished by adding various types of modulation to electromagnetic waves.

Thus, according to the present invention, a position pointing device is equipped with a storing means for storing the predetermined individual information, an electromagnetic wave receiving means for receiving an electromagnetic wave which is transmitted from a tablet and which contains the predetermined individual information and the write instruction therefor or the read instruction for the predetermined individual information, an instruction extracting means for extracting the predetermined individual information and the write instruction therefor or the read instruction for the predetermined individual information from the received electromagnetic wave, and an information control means for writing the predetermined individual information to the storing means in accordance with the extracted write instruction and reading the predetermined individual information as the predetermined information from the storing means in accordance with the extracted read instruction; and the tablet is equipped with an instruction creating means for creating the predetermined individual information and the write instruction therefor or the read instruction for the predetermined individual information, an electromagnetic wave transmitting means for transmitting an electromagnetic wave, which contains the predetermined individual information and the write instruction therefor or the read instruction for the predetermined individual information, to the position pointing device, and an information reproducing means for reproducing the predetermined individual information from the intensity characteristic, the frequency characteristic, or the time-dependent changes of these characteristics of a detected electromagnetic wave. Therefore, it is possible to write the predetermined individual information from the tablet to the position pointing device, and read the written predetermined individual information as necessary. Further, writing, for example, the error information on the coordinate values of pointed positions based on the variations in the characteristic of the position pointing device in advance as the individual information allows input operation to be started immediately without the need of determining the error every time the operation is started as in the past. Likewise, employing the information on applications as the individual information eliminates the need of setting or the like of a plurality of DIP switches. Further, employing identifying codes as the individual information eliminates the danger of the identifying codes being disclosed to other persons and also allows the contents of the identifying codes to be changes as required, thus making it possible to add to the security by rewriting the identifying codes each time they are used.

According to another aspect of the present invention, the position pointing device is equipped with an information generating means for generating at least one type of operating information, an electromagnetic wave receiving means for receiving an electromagnetic wave which is transmitted from the tablet and which contains the predetermined individual information and the write instruction therefor, the read instruction for the predetermined individual information, or the request instruction for operating information, an instruction extracting means for extracting the predetermined individual information and the write instruction therefor, the read instruction for the predetermined individual information, or the request instruction for operating information from the received electromagnetic wave, and an information control means for writing the predetermined individual information to the storing means in accordance with the extracted write instruction, reading the predetermined individual information as the predetermined information from the storing means to a characteristic control means in accordance with the extracted read instruction, and setting the operating information as the predetermined information in the characteristic control means in accordance with the extracted request instruction; and the tablet is equipped with an instruction creating means for creating the predetermined individual information and the write instruction therefor, the read instruction for the predetermined individual information, or the request instruction for the operating information, an electromagnetic wave transmitting means for transmitting an electromagnetic wave, which contains the predetermined individual information and the write instruction therefor, the read instruction for the predetermined individual information, or the request instruction for the operating information, to the position pointing device, and an information reproducing means for reproducing the predetermined individual information, the operating information from the intensity characteristic, the frequency characteristic, or the time-dependent changes of these characteristics of a detected electromagnetic wave; thus making it possible to transmit the operating information in addition to the predetermined individual information from the position pointing device to the tablet.

According to still another aspect of the present invention, the position pointing device is provided with a displaying means for displaying the predetermined individual information stored in the storing means to enable an operator to immediately recognize an application or the like set on the position pointing device.

What is claimed is:

1. A position detecting device wherein a position pointing device emits an AC field having a certain spatial distribution which corresponds to the coordinate value of a position pointed by the position pointing device, a tablet detects the AC field to determine the coordinate value of the position pointed by said position pointing device, and said position pointing device controls the intensity characteristic, frequency characteristic, or the time-dependent changes of these characteristics of said AC field in accordance with predetermined individual information, and the tablet detects them to determine the predetermined individual information from said position pointing device:

said position pointing device comprising:
a memory for storing predetermined individual information,
an AC field receiver for receiving an AC field transmitted from the tablet and which contains predetermined individual information and a write instruction therefor or a read instruction for said predetermined individual information,
an instruction extractor for extracting the predetermined individual information and the write instruction therefor or the read instruction for said predetermined individual information from said received AC field, and
an information controller for writing the predetermined individual information to said memory in accordance with said extracted write instruction and for reading the predetermined individual information from said memory as said predetermined individual information in accordance with said extracted read instruction; and said tablet comprising:
an instruction source for creating predetermined individual information and a write instruction therefor or a read instruction for reading said predetermined individual information,
an AC field transmitter for transmitting to the position pointing device an AC field, which contains said predetermined individual information and the write instruction therefor or the read instruction for said predetermined individual information, and
an information reproducer for reproducing the predetermined individual information from the intensity characteristic, frequency characteristic or time-dependent changes of these characteristics of the detected AC field.

2. A position detecting device having a position pointing device and a tablet:

said position pointing device comprising:
an AC field generator for generating an electromagnetic wave having a certain spatial distribution which corresponds to the coordinate value of a pointed position,
a characteristic controller for controlling the intensity characteristic, frequency characteristic or time-dependent changes in these characteristics of the AC field, which is generated by said AC field generator, in accordance with predetermined individual information,
a memory for storing the predetermined individual information,
an AC field receiver for receiving an AC field which is transmitted from the tablet and which contains predetermined individual information and a write instruction therefor or a read instruction for said predetermined individual information,
an instruction extractor for extracting the predetermined individual information and the write instruction therefor or the read instruction for said predetermined individual information from said received AC field, and
an information controller for writing the predetermined individual information to said storing means in accordance with said extracted write instruction and for reading the predetermined individual information from said memory as said predetermined information into the characteristic control means in accordance with said extracted read instruction; and said tablet comprising:
an instruction source for creating the predetermined individual information and the write instruction therefor or the read instruction for said predetermined individual information,
an AC field transmitter for transmitting to the position pointing device an AC field, which contains said predetermined individual information and the write instruction therefor or the read instruction for said predetermined individual information,
an AC field detector for detecting an AC field emitted from the position pointing device,
a coordinate detector for determining the coordinate value of a position specified by the position pointing device from the spatial distribution of said detected AC field, and
an information reproducer for reproducing the predetermined individual information from the intensity characteristic, frequency characteristic or time-dependent changes of these characteristics of said detected AC field.

3. A position detecting device having a position pointing device and a tablet:

said position pointing device comprising:
- an AC field generator for generating an AC field having certain spatial distribution which corresponds to the coordinate value of a pointed position,
- a characteristic controller for controlling in accordance with predetermined individual information an intensity characteristic, frequency characteristic, or time-dependent changes in these characteristics of the AC field, which is generated by said, AC field generator,
- a memory for storing the predetermined individual information,
- an information generator for generating at least one type of operating information,
- an AC field receiver for receiving an AC field which is transmitted from the tablet and which contains predetermined individual information and a write instruction therefor, a read instruction for said predetermined individual information, or a request instruction for operating information,
- an instruction extractor for extracting the predetermined individual information and the write instruction therefor, the read instruction for said predetermined individual information or the request instruction for the operating information from said received AC field, and
- an information controller for writing the predetermined individual information to said memory in accordance with said extracted write instruction, for reading the predetermined individual information from said memory as said predetermined individual information into the characteristic controller in accordance with said extracted read instruction, and setting said operating information as said predetermined individual information in the characteristic controller in accordance with said extracted request instruction; and said tablet comprising:
- an instruction source for creating the predetermined individual information and the write instruction therefor, the read instruction for said predetermined individual information, or the request instruction for the operating information,
- an AC field transmitter for transmitting AC field, which contains said predetermined individual information and the write instruction therefor, the read instruction for said predetermined individual information, or the request instruction for the operating information, to the position pointing device,
- an AC field detector for detecting an AC field emitted from the position pointing device,
- a coordinate detector for determining the coordinate value of a position specified by the position pointing device from the spatial distribution of said detected AC field, and
- an information reproducer for reproducing the predetermined individual information or the operating information from the intensity characteristic, frequency characteristic or time-dependent changes of these characteristics of said detected AC field.

4. A position detecting device according to claim 1, wherein the position pointing device is provided with a display for displaying predetermined individual information stored in the memory.

5. A position detecting device according to claim 1, wherein a resonance circuit is used as the AC field receiver of the position pointing device.

6. A position detecting device according to claim 5, wherein the resonance circuit of the position pointing device is employed as the AC field generator.

7. A position detecting device according to claim 6, wherein the resonance characteristic of the resonance circuit is changed to accomplish the characteristic controller of the position pointing device.

8. A position detecting device according to claim 5, comprising a power extractor for extracting electrical energy for driving the component units of the position pointing device from an AC field received through the resonance circuit.

9. A position detecting device according to claim 1, wherein the information on the characteristic of each position pointing device is used as the predetermined individual information and the tablet is provided with a processor for processing the coordinate value of a pointed position in accordance with said information which is reproduced.

10. A position detecting device according to claim 1, wherein information about an operator using the position pointing device is employed as the predetermined individual information and the tablet is provided with a processor which processes the coordinate value of a pointed position in accordance with said information which is reproduced.

11. A position detecting device according to claim 1, wherein the information indicating the application of each position pointing device is employed as the predetermined individual information and the tablet is provided with a processor for transferring to a host system said information, which has been reproduced, as well as the coordinate value of a pointed position.

12. A position detecting device according to claim 1, wherein the information for identifying respective position pointing devices is employed as the predetermined individual information and the tablet is provided with a processor for determining said information which has been reproduced, thereby controlling actuation.

13. A position pointing device comprising:
- an AC field generator for generating an electromagnetic wave having a certain spatial distribution which corresponds to the coordinate value of a pointed position,
- a characteristic controller for controlling an intensity characteristic, frequency characteristic, or time-dependent changes in these characteristics of the AC field, which is generated by said AC field generator, in accordance with predetermined individual information,
- a memory for storing the predetermined individual information,
- an AC field receiver for receiving an electromagnetic wave which is transmitted from a tablet and which contains predetermined individual information and a write instruction therefor or a read instruction for said predetermined individual information,
- an instruction extractor for extracting the predetermined individual information and the write instruction therefor or the read instruction for said predetermined individual information from said received AC field, and
- an information controller for writing the predetermined individual information to said memory in accordance with said extracted write instruction and reading the predetermined individual information from said memory as said predetermined individual information into the characteristic controller in accordance with said extracted read instructions.

14. A position pointing device comprising:
- an AC field generator for generating an AC field having a certain spatial distribution which corresponds to the coordinate value of a pointed position, a characteristic controller for controlling an intensity characteristic, frequency characteristic, or time-dependent changes in these characteristics of the AC field, which is generated by said AC field generator, in accordance with predetermined individual information, a memory for storing the predetermined individual information, an information generator for generating at least one type of operating information, an AC field receiver for receiving an electromagnetic wave which is transmitted from the tablet and which contains predetermined individual information and a write instruction therefor, a read instruction for said predetermined individual information, or a request instruction for operating information, an instruction extractor for extracting the predetermined individual information and the write instruction therefor, the read instruction for said predetermined individual information, or the request instruction for the operating information from said received AC field, and an information controller for writing the predetermined individual information to said memory in accordance with said extracted write instruction, for reading the predetermined individual information from said memory as said predetermined individual information into the characteristic controller in accordance with said extracted read instruction, and setting said operating information as said predetermined information in the characteristic controller in accordance with said extracted request instruction.

15. A position pointing device according to claim 13, comprising a display for displaying the predetermined individual information stored in the memory.

16. A position pointing device according to claim 13, wherein a resonance circuit is used as an AC field receiver.

17. A position pointing device according to claim 16, wherein the resonance circuit is used as an AC field generator.

18. A position pointing device according to claim 17, wherein the resonance characteristic of the resonance circuit is changed to accomplish a characteristic control means.

19. A position pointing device according to claim 16, comprising a power extractor for extracting electrical energy for driving component units from an AC field received through the resonance circuit.

* * * * *